United States Patent Office 2,747,990
Patented May 29, 1956

2,747,990

PROCESS OF PRODUCING GREY CAST IRON

Henton Morrogh, Tanworth-in-Arden, England, assignor to The British Cast Iron Research Association, Alvechurch, Birmingham, England No Drawing. Application May 25, 1953, Serial No. 357,348

13 Claims. (Cl. 75—130)

This invention relates to the production of grey cast iron in which the graphite is present wholly or predominately in nodular form, and in particular to the production of such cast iron by the introduction of calcium into the molten metal.

The invention may be regarded as a modification of or improvement in the process disclosed in my copending application Serial No. 89,800, filed April 26, 1949, Patent No. 2,661,281, granted December 1, 1953. According to that invention calcium, calcium carbide, calcium oxide or other calcium compound (or alloy) is added to the molten iron at temperatures of at least 1650° C. (or the addition is made at lower temperatures and the melt then raised to at least 1650° C.). At 1650° C. or higher the calcium oxide first formed is converted into calcium carbide, which dissolves in the molten iron, and, provided that calcium is present in excess of that required to reduce the sulphur content in the cast iron to 0.02%, the graphite in the cast iron is found to be wholly or predominately nodular in form; no subsequent heat treatment is necessary.

It has now been found that calcium may effectively and conveniently be introduced into cast iron at melt temperatures normally employed, for example 1300–1500° C., provided that the addition is made under conditions which substantially prevent the formation of calcium oxide.

According to the present invention, therefore, molten iron which on casting gives a grey cast iron is treated at temperatures below 1650° C. with a calcium-providing substance under such conditions that formation of calcium oxide is substantially prevented. Preferably the calcium is added in the form of calcium carbide, but other calcium-providing substances may be used, e. g. calcium silicide, calcium alloys (such as calcium-nickel), calcium nitride, calicum cyanamide, or calcium hydride, provided they are capable of being added under conditions which avoid the formation of calcium oxide. Thus calcium carbonate, hydroxide and oxalate are unsuitable for use in accordance with the present invention, since they are converted at once into calcium oxide and a temperature of at least 1650° C. would be required to convert this into calcium carbide and dissolve it in the molten iron.

Since it is usually inconvenient on a commercial scale to maintain an inert atmosphere over the surface of the molten iron in the runs from the furnace or in the ladles or the moulds, the formation of calcium oxide is prevented, according to the preferred form of the invention, by introducing the calcium-providing substance below the surface of the molten iron at any convenient point between the furnace and the moulds. Thus finely powdered calcium carbide may be carried in a stream of inert gas, such as nitrogen or hydrogen under pressure through a tube which extends below the surface of the molten iron. If desired, the ladle may be provided with a suitable tube integral with the ladle itself, and the tube conveying the calcium carbide or the like may be fitted into the upper end of the ladle tube for each pouring. The agitation of the molten metal by the stream of inert gas assists the solution and even distribution of the calcium in the iron.

The iron used as starting material should preferably be hypereutectic in relation to carbon, i. e. it should give on casting an iron in which the carbon content exceeds $$4.3 - \frac{1}{3}(P + Si)$$

where P and Si stand for the percentages of phosphorus and silicon, respectively.

The calcium-providing substances used are very efficient desulphurising agents, and until the sulphur content of the molten iron has fallen below 0.02% no solution of calcium in the iron takes place. The amount of calcium-providing substance added must therefore be in excess of that required to reduce the sulphur content to 0.02% and also to remove, as calcium oxide, any oxygen present in the molten iron. Where the iron contains much sulphur it may be desirable to effect a preliminary desulphurisation by one of the usual methods before the calcium addition.

After the introduction of calcium in accordance with the invention it is advantageous to treat the molten metal with a graphitising inoculant, such as ferrosilicon. This results in a more uniformly nodular graphite structure, reduces the chill and improves the mechanical properties.

The grey cast iron obtained according to the invention has the remarkably enhanced mechanical properties which are associated with a predominantly nodular graphite structure, and has the added advantage of cheapness of production in comparison with other methods of nodulisation. No annealing or other heat-treatment is necessary.

This application is a continuation of application Serial No. 173,935, filed July 14, 1950, now abandoned.

I claim:

1. Process for the production of a grey cast iron containing calcium and having its graphite content at least predominantly in nodular form, in which a molten iron which when cast gives a grey cast iron hypereutectic in relation to carbon is treated at temperatures below 1650° C. under non-oxidizing conditions with a calcium-providing substance selected from the group consisting of calcium, calcium alloys and calcium compounds other than those which form calcium oxide, even under non-oxidizing conditions, in the molten iron at temperatures below 1650° C., the amount of said calcium-providing substance employed being in excess of that required to reduce the sulphur content to not over 0.02% and also to remove, as calcium oxide, any oxygen present in the molten iron.

2. Process as claimed in claim 1 in which the calcium-providing substance is introduced below the surface of the molten iron.

3. Process as claimed in claim 1 in which the calcium-providing substance is borne on a stream of inert gas through a tube dipping below the surface of the molten iron.

4. Process as claimed in claim 1 in which the calcium-providing substance is selected from the group consisting of calcium carbide, calcium silicide, calcium nitride, a calcium alloy, calcium cyanamide and calcium hydride.

5. Process as claimed in claim 1 in which, after the addition of the calcium-providing substance and before casting, there is added to the molten iron a graphitising inoculant.

6. Process as claimed in claim 5 in which the graphitising inoculant is chosen from the group consisting of ferrosilicon and graphite.

7. The process set forth in claim 1, wherein the calcium-providing substance is calcium carbide.

8. The process set forth in claim 7, wherein the calcium carbide is introduced in finely divided condition below the surface of the molten iron in a manner effecting even distribution therethrough.

9. The process set forth in claim 8, wherein the calcium carbide, in finely powdered form, is carried into the molten iron by a stream of inert gas.

10. The process set forth in claim 9, wherein a graphitising inoculant is added to the molten iron after the treatment with calcium carbide and before casting.

11. The process set forth in claim 10, wherein the temperature of the molten iron during the stated procedure is within the range of 1300° to 1500° C.

12. The process of producing grey cast iron containing calcium and having its graphite content at least predominantly in nodular form, which comprises providing an iron melt which is hypereutectic in relation to carbon and which on casting gives a grey cast iron, passing into said melt below the surface thereof, while the melt is at temperatures within the range of 1300° to 1500° C., a stream of inert gas carrying finely divided calcium carbide, such passage being continued until the sulphur content of the melt has been reduced to not over 0.02% and any oxygen present therein has been removed and until excess calcium carbide has dissolved into the melt, and casting the treated melt.

13. The process set forth in claim 12, which further includes adding a graphitising inoculant to the melt prior to casting.

References Cited in the file of this patent

UNITED STATES PATENTS

| | | |
|---|---|---|
| 1,587,600 | Neilsen | June 8, 1926 |
| 2,485,760 | Millis et al. | Oct. 25, 1949 |
| 2,662,820 | Crome | Dec. 15, 1953 |

FOREIGN PATENTS

| | | |
|---|---|---|
| 638,255 | Great Britain | June 7, 1950 |